United States Patent
Xu

(10) Patent No.: US 10,276,126 B2
(45) Date of Patent: Apr. 30, 2019

(54) INFORMATION PROCESSING METHOD AND ELECTRONIC DEVICE

(71) Applicants: Beijing Lenovo Software Ltd., Beijing (CN); Lenovo (Beijing) Limited, Beijing (CN)

(72) Inventor: Ben Xu, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 198 days.

(21) Appl. No.: 14/812,081

(22) Filed: Jul. 29, 2015

(65) Prior Publication Data
US 2016/0048201 A1    Feb. 18, 2016

(30) Foreign Application Priority Data

Aug. 18, 2014  (CN) .......................... 2014 1 0406337

(51) Int. Cl.
*G09G 5/00* (2006.01)
*G06F 3/01* (2006.01)
(Continued)

(52) U.S. Cl.
CPC ........... *G09G 5/003* (2013.01); *G06F 1/1652* (2013.01); *G06F 3/0484* (2013.01); *G06F 2203/04803* (2013.01); *G09G 2380/02* (2013.01)

(58) Field of Classification Search
CPC ........ G06F 2203/04803; G06F 1/1652; G09G 2380/02
See application file for complete search history.

(56) References Cited

U.S. PATENT DOCUMENTS 8,910,077 B2 * 12/2014 Onda .................... G06F 9/4443
                                                       715/781
2013/0265221 A1 * 10/2013 Lee ........................... G06F 3/01
                                                       345/156
(Continued)

FOREIGN PATENT DOCUMENTS

CN           103297605 A     9/2013

OTHER PUBLICATIONS

"Chinese Application No. 201410406337.2, Office Action dated Jan. 6, 2017", w/ English Translation, (Jan. 6, 2017), 15 pgs.
(Continued)

*Primary Examiner* — Amr A Awad
*Assistant Examiner* — Stephen A Bray
(74) *Attorney, Agent, or Firm* — Schwegman Lundberg & Woessner, P.A.

(57) ABSTRACT

The present disclosure provides an information processing method and an electronic device. The electronic device has a display unit, and is capable of generating a deformation in response to a stress. The display unit of the electronic device is capable of presenting M window interfaces, each of the M window interfaces being used for displaying a separate display content. The method comprises: determining a first display sub-region of the display unit which is in a presentation state, when it is judged that the electronic device has generated a predetermined deformation; obtaining a first attribute parameter of a first window interface among the M window interfaces; and displaying the first window interface in the first display sub-region if the first attribute parameter satisfies a preset condition.

15 Claims, 2 Drawing Sheets

---

```
┌──────────────────────────────────────────────────────────────┐
│ Determine a first display sub-region of the display unit     │ ──/── S101
│ which is in a presentation state, when it is judged that the │
│ electronic device has generated a predetermined deformation  │
└──────────────────────────────────────────────────────────────┘
                              │
                              ▼
┌──────────────────────────────────────────────────────────────┐
│ Obtain a first attribute parameter of a first window         │ ──/── S102
│ interface among the M window interfaces                      │
└──────────────────────────────────────────────────────────────┘
                              │
                              ▼
┌──────────────────────────────────────────────────────────────┐
│ Display the first window interface in the first display      │ ──/── S103
│ sub-region, when the first attribute parameter satisfies a   │
│ preset condition                                             │
└──────────────────────────────────────────────────────────────┘
```

(51) Int. Cl.
*G06F 1/16* (2006.01)
*G06F 3/0484* (2013.01)

(56) References Cited

U.S. PATENT DOCUMENTS

2014/0137041 A1* 5/2014 Jeon ................ G06F 3/0482
  715/815
2014/0176421 A1* 6/2014 Chen ................ G06F 1/1652
  345/156
2015/0220119 A1* 8/2015 Seo ................. G06F 3/041
  345/173

OTHER PUBLICATIONS

"Chinese Application No. 201410406337.2, Office Action dated Oct. 18, 2016", w/ English Translation, (Oct. 18, 2016), 12 pgs.

* cited by examiner

INFORMATION PROCESSING METHOD AND ELECTRONIC DEVICE

CROSS-REFERENCE TO RELATED APPLICATION(S)

This application claims priority to Chinese Application No. 201410406337.2, filed on Aug. 18, 2014, which is incorporated herein by reference in its entirety.

BACKGROUND

Technical Field

The present disclosure relates to a field of electronic techniques, and particularly, to an information processing method and an electronic device.

Related Art

Compared to a traditional screen, a flexible screen has more obvious advantages. The flexible screen is not only thinner and lighter in volume, but has lower power consumption than the traditional one, which may facilitate to improve battery life of the device. The durability of the flexible screen is also significantly greater than the traditional screens due to good flexibility and pliability characteristics of the flexible screen, which reduce a probability of unexpected damages of the device. Due to these advantages of the flexible screen, the flexible screen will be widely used in future with continuous popularization of personal intelligent terminals.

With widespread use of the flexible screen, the flexible screen for different scenario needs will be subject to greater challenges. For example, the flexible screen may be folded, and a display region may be changed when the flexible screen is folded. In related technical solutions, there is no display scheme for adapting displaying of windows when the display region is changed. Therefore, the display effect of displaying the windows in the flexible screen is not good conventionally.

SUMMARY

Embodiments of the present disclosure provide an information processing method and an electronic device for improving the display effect of displaying the windows in the flexible screen.

In a first aspect, an embodiment of the present disclosure provides an information processing method applied in an electronic device, the electronic device comprising a display unit and being capable of generating a deformation against stress, the display unit of the electronic device capable of presenting M window interfaces, each of the M window interfaces being used for displaying a separate display content, wherein M is an positive integer no less than 1, the method comprising steps of:

determining a first display sub-region of the display unit which is in a presentation state, when it is judged that the electronic device has generated a predetermined deformation;

obtaining a first attribute parameter of a first window interface among the M window interfaces; and displaying the first window interface in the first display sub-region if the first attribute parameter satisfies a preset condition.

Preferably, if the electronic device comprises a first sensing unit, whether the electronic device has generated the predetermined deformation is judged by using a first sensing parameter of the first sensing unit.

Preferably, the predetermined deformation comprises:
a deformation in which the electronic device is bent into a plurality of sub-parts, or
a deformation in which the electronic device is folded into a plurality of sub-parts,
wherein a degree of the bending or the folding is larger than a first threshold.

Preferably, if the first sensing unit comprises a plurality of sensing sub-units, information about gestures of the plurality of sub-parts of the electronic device is obtained by the plurality of sensing sub-units.

Preferably, determining a first display sub-region of the display unit which is in a presentation state comprises:
determining, by at least one of the plurality of sensing sub-units, that a first part of the electronic device is in a face-upward gesture; and
determining the display sub-region corresponding to the first part as the first display sub-region in the presentation state.

Preferably, if the electronic device further comprises a second sensing unit, determining a first display sub-region of the display unit which is in a presentation state comprises:
determining that a first part of the electronic device is in an uncovered state by using a second sensing parameter of the second sensing unit; and
determining the display sub-region corresponding to the first part as the first display sub-region in the presentation state.

Preferably, if the first attribute parameter satisfies the preset condition, after displaying the first window interface in the first display sub-region, the method further comprises:
displaying the M windows in current display region, when it is judged that the predetermined deformation is recovered.

In a second aspect, an embodiment of the present disclosure provides an electronic device, comprising a display unit and being capable of generating a deformation against stress, the display unit of the electronic device capable of presenting M window interfaces, each of the M window interfaces being used for displaying a separate display content, wherein M is an positive integer no less than 1, the electronic device further comprising:

a first judging unit, configured to determine a first display sub-region of the display unit which is in a presentation state, when it is judged that the electronic device has generated a predetermined deformation;

an obtaining unit, configured to obtain a first attribute parameter of a first window interface among the M window interfaces; and a control unit, configured to display the first window interface in the first display sub-region, if the first attribute parameter satisfies a preset condition.

Preferably, if the electronic device comprises a first sensing unit, the first judging unit is particularly configured to judge whether the electronic device has generated the predetermined deformation by using a first sensing parameter of the first sensing unit.

Preferably, the predetermined deformation comprises:
a deformation in which the electronic device is bent into a plurality of sub-parts, or
a deformation in which the electronic device is folded into a plurality of sub-parts,
wherein a degree of the bending or the folding is larger than a first threshold.

Preferably, the first sensing unit comprises a plurality of sensing sub-units, and the plurality of sensing sub-units are configured to obtain information about gestures of the plurality of sub-parts of the electronic device.

Preferably, at least one of the plurality of sensing sub-units are particularly configured to: determine that a first part of the electronic device is in a face-upward gesture; and the first judging unit is further configured to determine the display sub-region corresponding to the first part as the first display sub-region in the presentation state.

Preferably, if the electronic device further comprises a second sensing unit, the first judging unit is particularly configured to:

determine that a first part of the electronic device is in an uncovered state using a second sensing parameter of the second sensing unit; and determine the display sub-region corresponding to the first part as the first display sub-region in the presentation state.

Preferably, the electronic device further comprises a second judging unit, configured to display the M windows in current display region, when it is judged that the predetermined deformation is recovered.

BRIEF DESCRIPTION OF THE DRAWINGS

In order to illustrate the technical solutions in the embodiments of the present invention more clearly, drawings used for description on the embodiments will be introduced simply. Obviously, the drawings are only for some embodiments of the present invention. Other drawings may also be obtained according to these drawings by the skilled in the art without any creative labor.

DETAILED DESCRIPTION OF THE EMBODIMENTS

In order to improve the display effect of displaying the windows in the flexible screen, the embodiments of the present disclosure provide an information processing method and an electronic device.

In order to further illustrate objects, technical solutions and advantages of the embodiments of the present disclosure, the technical solutions of the embodiments of the present disclosure will be described clearly and completely, in connection with the drawings of the embodiments in the present disclosure. Obviously, the embodiments as described below are only a part of embodiments of the present disclosure, rather than all of the embodiments thereof. Based on the embodiments of the present disclosure, all of other embodiments obtained by the skilled in the art without any creative labor fall into the protection scope of the present invention.

An embodiment of the present disclosure provides an information processing method applied in an electronic device, the electronic device comprising a display unit and being capable of generating a deformation against stress, the display unit of the electronic device capable of presenting M window interfaces, each of the M window interfaces being used for displaying a separate display content, wherein M is an positive integer no less than 1. The electronic device may be a smart phone, PAD (tablet), PDA (Personal Digital Assistant) having a flexible screen. Or, the electronic device, such as smart phone, PAD, PDA and etc., per se may deform.

Figure 1:
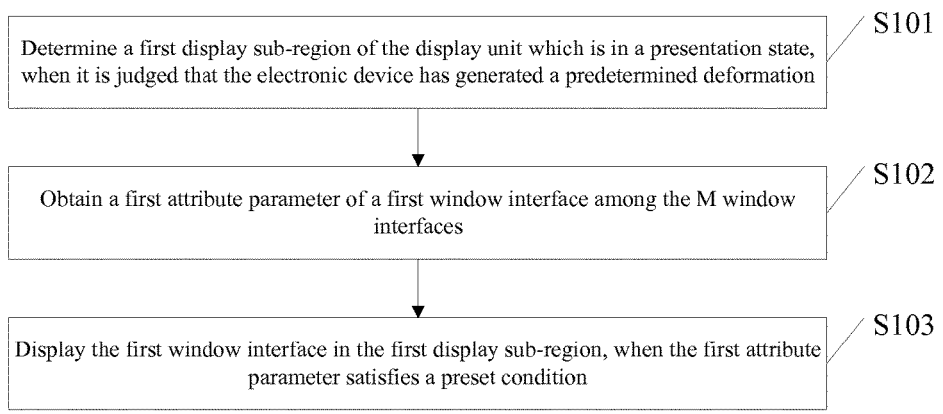
FIG. 1 is a flowchart of an information processing method in an embodiment of the present disclosure.

As shown in FIG. 1 which shows a flowchart of the information processing method in one embodiment of the present disclosure, the information processing method may comprise following steps.

In step S101, when it is judged that the electronic device has generated a predetermined deformation, a first display sub-region of the display unit which is in a presentation state is determined.

Figure 2:
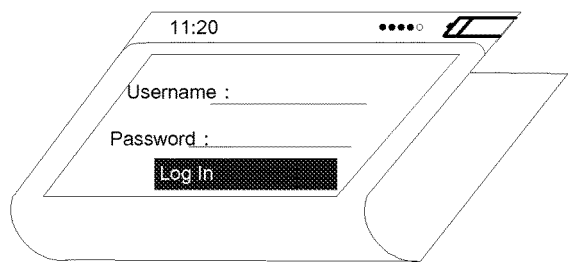
FIG. 2 is a gesture and display state of an electronic device when it has generated a predetermined deformation in an embodiment of the present disclosure.

In particular, the predetermined deformation may is a deformation in which the electronic device is bent into a plurality of sub-parts, or a deformation in which the electronic device is folded into a plurality of sub-parts, wherein a degree of the bending or the folding is larger than a first threshold. The first threshold may be set as any of appropriate angles, such as 30°, 40°, 50°, 90° etc., as long as it is no larger than an angle value of a maximum deformation value for flexible material of the electronic device. After the electronic device has generated the predetermined deformation, the electronic device or the display unit of the electronic device is folded or bent into a plurality of sub-parts which divide the display region into a plurality of display sub-regions, as shown in FIG. 2, including a first display sub-region in the presentation state and other display sub-regions not in the presentation state.

Preferably, there are at least two implementations as follows of determining the first display sub-region of the display unit which is in the presentation state.

First Example

In particular, the electronic device comprises a first sensing unit, and it is judged whether the electronic device has generated the predetermined deformation by using a first sensing parameter of the first sensing unit.

For example, the first sensing unit is a sensing unit capable of sensing variation of the stress. In particular, the first sensing unit may be relevant to the flexible material of the electronic device. The type of the first sensing unit may be selected depend on the flexible material of the electronic device, so that the parameter on deformation of the flexible material may be detected, in order to determine whether the electronic device has generated the predetermined deformation. The first sensing unit may also be a sensing unit independent of the flexible material of the electronic device. For example, the first sensing unit may be an orientation sensor (o-sensor), a pressure sensor etc. It may be determined whether the electronic device generates the predetermined deformation by the pressure sensor detecting a position region where the electronic device is subject to the pressure. It may be determined whether the electronic device generates the predetermined deformation by the o-sensor detecting a face-upward region and a face-downward region of the electronic device.

Further, the first sensing unit comprises a plurality of sensing sub-units, which are distributed at different position regions of the electronic device, and obtain, by the plurality of sensing sub-units, gesture information on the plurality of sub-parts of the electronic device.

A first part in a face-upward gesture of the electronic device is determined by at least one of the plurality of sensing sub-units. The display sub-region corresponding to the first part is determined as the first display sub-region in the presentation state.

In particular, the first sensing unit comprises a plurality of o-sensors. The orientation of each of the plurality of sub-parts may be determined according to an orientation parameter obtained by each of the plurality of o-sensors, so as to determine that the first part (which is one of the plurality of sub-parts) is in the face-upward gesture.

Second Example

The electronic device comprises a second sensing unit, which is different from the first sensing unit. A first part in an uncovered state of the electronic device is determined by using a second sensing parameter of the second sensing unit, and the display sub-region corresponding to the first part is determines as the first display sub-region in the presentation state.

In particular, the second sensing unit is a light sensor which may sense variation of the light. The second sensing unit comprises a plurality of light sensors. Brightness parameters of the plurality of sub-parts may be obtained by the plurality of light sensors, so as to determine the first part (which is one of the plurality of sub-parts) in the uncovered state of the plurality of sub-parts. Then the display sub-region corresponding to the first part may be determined as the first display sub-region in the presentation state, as shown in FIG. 2.

In step S102, a first attribute parameter of a first window interface among the M window interfaces is obtained.

In a particular implementation, the first window interface is any of the M window interfaces. Particularly, in order to judge whether each window interface needs to be displayed in the first display sub-region, the attribute parameter of each of the M window interfaces is judged sequentially.

Example One: the attribute parameter of the window interface is one indicates whether the window interface is allowed to be folded; and the attribute of the window interface is particularly that the window interface is allowed to be folded or is not allowed to be folded.

Example Two: the attribute parameter of the window interface is one indicates a ratio of the window interface in the first display sub-region to an entire window interface, or a display area of the window interface in the first display sub-region.

In a particular implementation, steps S101 and S102 are independent processes. Steps S101 and S102 may be performed simultaneously. Also, after it is judged that the predetermined deformation has occurred, step S101 may be performed firstly or step S102 may be performed firstly In step S103, if the first attribute parameter satisfies the preset condition, the first window interface is controlled to be displayed in the first display sub-region.

Specifically, the preset condition for Example One comprises being displayed if it is not allowed to be folded; and being not displayed if it is allowed to be folded. Thus, when the first attribute parameter is "Not Allowed To Be Folded", the electronic device learns that the first attribute parameter of the first window interface is "Not Allowed To Be Folded", and then controls the first window interface to be displayed in the first display sub-region. Alternatively, when the first attribute parameter is "Allowed To Be Folded", the electronic device learns that the first attribute parameter of the first window interface is "Allowed To Be Folded", and then controls to prevent the first window interface from being displayed in the first display sub-region.

The preset condition for Example Two is a preset ratio value or area value, which is not specifically limited by the embodiments of the present disclosure. For example, if the preset condition is a preset ratio value of 80%, it is judged whether the display ratio of the first window interface in the first display sub-region is no less than 80%; if so, the first window interface is controlled to be displayed in the first display sub-region; if not, the first window interface is controlled not to be displayed in the first display sub-region.

Steps S102-S103 are performed sequentially for the M window interfaces in turn, so as to determine that N of the M window interfaces need to be displayed in the first display sub-region, where N is a positive integer no more than M.

In particular, the N window interfaces may be displayed in the first display sub-regions in a partly-overlapped way, or in a totally non-overlapped way. Assuming that the N window interfaces are displayed in the partly-overlapped way, display positions of the N window interfaces in the first display sub-region are calculated according to a window distribution algorithm corresponding to the partly-overlapped way; assuming that the N window interfaces are displayed in the totally non-overlapped way, display positions of the N window interfaces in the first display sub-region are calculated according to a window distribution algorithm corresponding to the totally non-overlapped way.

By step S103, the window interface which satisfies the preset condition may be controlled to be displayed in the first display sub-region in the presentation state.

Further, for the purpose of dynamically changing the display window displayed in current display region according to the change of the display region in order to better adapt to the display requirements, the embodiments of the present disclosure further provide a process of displaying the M windows in current display region when it is judged that the predetermined deformation is recovered. Of course, in the particular implementation, when it is judged that the predetermined deformation is recovered, the first window interface is controlled to be displayed in a recovered display region.

Figure 3:
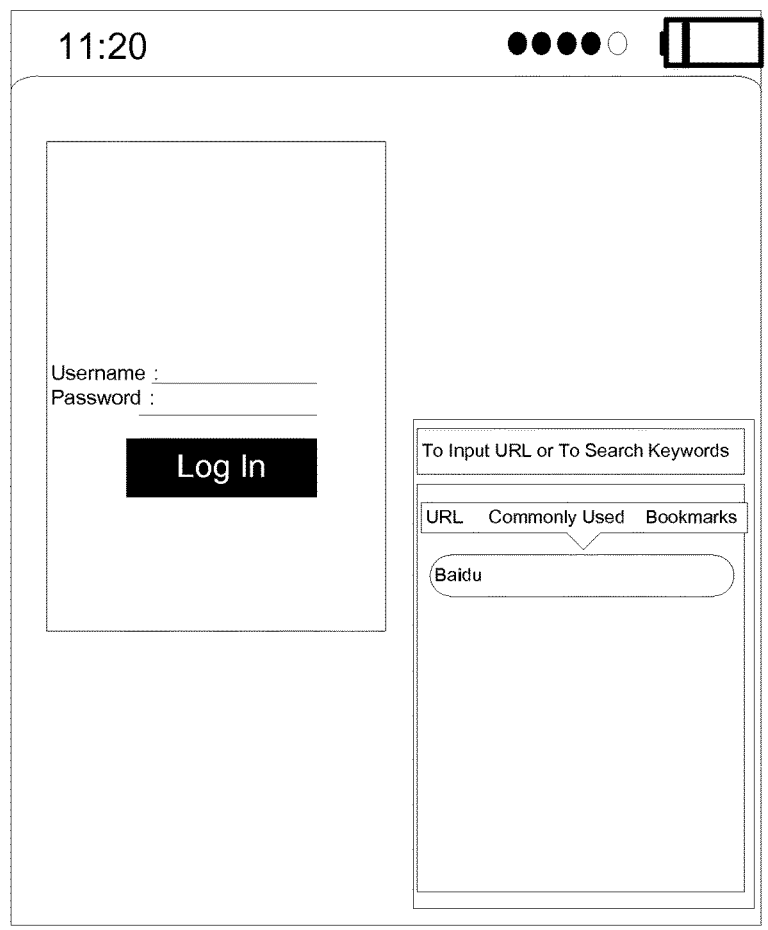
FIG. 3 is a gesture and display state of an electronic device when it has not generated a predetermined deformation or recovers from the predetermined deformation in an embodiment of the present disclosure.

For example, as shown in FIG. 3, before the electronic device has the predetermined deformation, there are two display interfaces displayed in the display unit. After the predetermined deformation occurs, one display interface is displayed in the first display sub-region of the display unit, as shown in FIG. 2. When the electronic device is recovered to the gesture as shown in FIG. 3 from the gesture as shown in FIG. 2, the display unit displays two window interfaces as shown in FIG. 3.

Hereinafter, the technical solution of the embodiment of the present disclosure will be described in detail in connection with FIGS. 2 and 3. However, the present disclosure is not limited to this.

When the user bends the electronic device from the gesture as shown in FIG. 3 to the gesture as shown in FIG. 2, it is judged that the predetermined deformation occurs to the electronic device according to the brightness sensing parameters (or the orientation sensing parameters) obtained by a plurality of light sensors (or a plurality of o-sensors) in the electronic device, and the first display sub-region of the display unit which is in the presentation state is determined by using the plurality of light sensors or the plurality of o-sensors.

The attribute parameter of a log-in window interface in the window interface displayed in the display unit is obtained, and it is judged whether the attribute parameter of the log-in window interface satisfies the preset condition. If satisfied, the log-in window interface is controlled to be displayed in the first display sub-region; otherwise, the log-in window interface is not displayed in the first display sub-region. The attribute parameter of a browser window interface displayed in the display unit is also obtained, and it is judged whether the attribute parameter of the browser window interface satisfies the preset condition. If satisfied, the browser window interface is controlled to be displayed in the first display sub-region; otherwise, the browser window interface is not displayed in the first display sub-region. The display interface of the windows is shown in FIG. 3, based on the fact that the log-in window interface satisfies the preset condition while the browser window interface does not satisfies the preset condition.

Figure 4:
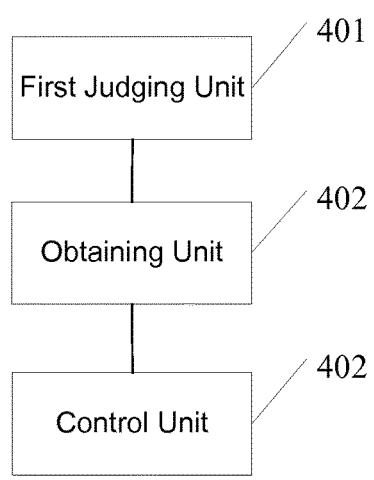
FIG. 4 is a structure diagram of an electronic device in an embodiment of the present disclosure.

Based on the same inventive concept, the embodiment of the present disclosure further provides an electronic device, comprising a display unit and being capable of generating a deformation against stress, the display unit of the electronic device capable of presenting M window interfaces, each of the M window interfaces being used for displaying a separate display content, wherein M is an positive integer no less than 1, as shown in FIG. 4. The electronic device further comprises:

a first judging unit 401, configured to determine a first display sub-region of the display unit which is in a presentation state, when it is judged that the electronic device has generated a predetermined deformation;

an obtaining unit 402, configured to obtain a first attribute parameter of a first window interface among the M window interfaces; and a control unit 403, configured to display the first window interface in the first display sub-region, if the first attribute parameter satisfies a preset condition.

Preferably, if the electronic device comprises a first sensing unit 401, the first judging unit is particularly configured to judge whether the electronic device has generated the predetermined deformation by using a first sensing parameter of the first sensing unit.

Preferably, the predetermined deformation comprises:

a deformation in which the electronic device is bent into a plurality of sub-parts, or a deformation in which the electronic device is folded into a plurality of sub-parts, wherein a degree of the bending or the folding is larger than a first threshold.

Preferably, the first sensing unit comprises a plurality of sensing sub-units, and the plurality of sensing sub-units are configured to obtain information about gestures of the plurality of sub-parts of the electronic device.

Preferably, at least one of the plurality of sensing sub-units are particularly configured to determine, by at least one of the plurality of sensing sub-units, that a first part of the electronic device is in a face-upward gesture. And, the first judging unit is further configured to determine the display sub-region corresponding to the first part as the first display sub-region in the presentation state.

Preferably, if the electronic device further comprises a second sensing unit, the first judging unit 401 is particularly configured to:

determine that the first part of the electronic device is in an uncovered state using a second sensing parameter of the second sensing unit; and determine the display sub-region corresponding to the first part as the first display sub-region in the presentation state.

Preferably, the electronic device further comprises a second judging unit, configured to display the M windows in current display region, when it is judged that the predetermined deformation is recovered.

Since the electronic device as described in the present embodiment is the electronic device which implements the information processing method in the embodiment of the present disclosure, the skilled in the art may understand particular implementations of the electronic device in the present embodiment and various variations thereof, based on the information processing method previously described in the embodiment of the present disclosure. Therefore, the description of the electronic device will be omitted for simplicity. All of the electronic devices used by the skilled in the art for implementing the information processing method according to the embodiments of the present disclosure fall into the protection scope of the present disclosure.

The technical solutions of the embodiments of the present disclosure as previously described have at least the following technical effects or advantages:

The electronic device of the present disclosure includes a display unit, and can generate the deformation against the stress. The display unit of the electronic device can present M window interfaces, each of the M window interfaces being used for displaying a separate display content. When it is judged that the electronic device has generated a predetermined deformation, the first display sub-region of the display unit which is in the presentation state is determined; the first attribute parameter of the first window interface among the M window interfaces is obtained; and the first window interface is controlled to be displayed in the first display sub-region, if the first attribute parameter satisfies the preset condition. By the technical solution as described above, after the predetermined deformation such as being folded is detected, the window interface needed to be displayed in the first display sub-region in the presentation state may be determined according to the attribute parameter of each window interface presented on the display unit. Therefore, the window interface needed to be displayed in the first display sub-region in the presentation state may be changed according to the deformation of the electronic device, improving the display effect of displaying the windows in the flexible screen, and optimizing the display of the window interfaces in the variable display region. Furthermore, by the technical solution as described above, the process of manually adapting, by the user, the window interface to the display sub-region currently presented may be avoid, which allows rapid and convenient interactions.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage medium (including, but not limited to, magnetic disk storage, CD-ROM, optical storage) containing computer readable program codes.

The present disclosure have been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by the computer or the processor of any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute an article of manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

In particular, the computer program instructions corresponding to the information processing method in the embodiment of the present disclosure may be stored in a storage medium such as an optical disc, a hard disc, a U disc etc. When the computer program instructions in the storage medium corresponding to the information processing method are read or executed, the process comprises steps of:

determining a first display sub-region of the display unit which is in a presentation state, when it is judged that the electronic device has generated a predetermined deformation;

obtaining a first attribute parameter of a first window interface among the M window interfaces; and displaying the first window interface in the first display sub-region if the first attribute parameter satisfies a preset condition.

Preferably, if the electronic device comprises a first sensing unit, whether the electronic device has generated the predetermined deformation is judged by using a first sensing parameter of the first sensing unit.

Preferably, the predetermined deformation comprises:
a deformation in which the electronic device is bent into a plurality of sub-parts, or
a deformation in which the electronic device is folded into a plurality of sub-parts,
wherein a degree of the bending or the folding is larger than a first threshold.

Preferably, if the first sensing unit comprises a plurality of sensing sub-units, information about gestures of the plurality of sub-parts of the electronic device is obtained by the plurality of sensing sub-units.

Preferably, determining a first display sub-region of the display unit which is in a presentation state comprises:
determining, by at least one of the plurality of sensing sub-units, that a first part of the electronic device is in a face-upward gesture;
determining the display sub-region corresponding to the first part as the first display sub-region in the presentation state.

Preferably, if the electronic device further comprises a second sensing unit, determining a first display sub-region of the display unit which is in a presentation state comprises:
determining that a first part of the electronic device is in an uncovered state by using a second sensing parameter of the second sensing unit;
determining the display sub-region corresponding to the first part as the first display sub-region in the presentation state.

Preferably, if the first attribute parameter satisfies the preset condition, after displaying the first window interface in the first display sub-region, the method further comprises:
displaying the M windows in current display region, when it is judged that the predetermined deformation is recovered.

Although preferred embodiments of the present disclosure have been described, the skilled in the art may make additional variations and modifications on these embodiments once he knows the basic inventive concept. Therefore, the appended claims intend to be explained as including the preferred embodiments and all of variations and modifications falling into the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed:

1. An information processing method applied in an electronic device, the method comprising:
determining a first display sub-region of a display unit of the electronic device which is in a presentation state, when it is judged that the electronic device has generated a predetermined deformation against stress;
obtaining attribute parameters of at least two window interfaces supported by the display unit of the electronic device before deformation, wherein each of the at least two window interfaces is used for displaying a separate display content, and wherein the attribute parameters of the at least two window interfaces are indicating whether a window interface is allowed to be folded, when the window interface is not allowed to be folded, scaling down the window interface and controlling the window interface to be displayed in the first display sub-region; and
displaying, in the first display sub-region, only one or more window interfaces of the at least two window interfaces that have an attribute parameter satisfying a preset condition.

2. The method according to claim 1, wherein, if the electronic device comprises a first sensing unit, whether the electronic device has generated the predetermined deformation is judged by using a first sensing parameter of the first sensing unit.

3. The method according to claim 1, wherein the predetermined deformation comprises:
a deformation in which the electronic device is bent into a plurality of sub-parts, or
a deformation in which the electronic device is folded into a plurality of sub-parts,
wherein a degree of the bending or the folding is larger than a first threshold.

4. The method according to claim 2, wherein, if the first sensing unit comprises a plurality of sensing sub-units, information about gestures of the plurality of sub-parts of the electronic device is obtained by the plurality of sensing sub-units.

5. The method according to claim 4, wherein determining a first display sub-region of the display unit which is in a presentation state comprises:

determining, by at least one of the plurality of sensing sub-units, that a first part of the electronic device is in a face-upward gesture; and determining the display sub-region corresponding to the first part as the first display sub-region in the presentation state.

6. The method according to claim 1, wherein, if the electronic device further comprises a second sensing unit, determining a first display sub-region of the display unit which is in a presentation state comprises:

determining that a first part of the electronic device is in an uncovered state by using a second sensing parameter of the second sensing unit; and determining the display sub-region corresponding to the first part as the first display sub-region in the presentation state.

7. The method according to claim 1, wherein, after displaying, in the first display sub-region, the at least one of the at least two window interfaces that has the attribute parameter satisfying the preset condition, the method further comprises:

displaying the at least two window interfaces in a current display region, when it is judged that the predetermined deformation is recovered.

8. An electronic device, comprising a display unit and being capable of generating a deformation against stress, the display unit of the electronic device without deformation capable of presenting at least two window interfaces, each of the at least two window interfaces being used for displaying a separate display content, the electronic device further comprising:

a first judging unit, configured to determine a first display sub-region of the display unit which is in a presentation state, when it is judged that the electronic device has generated a predetermined deformation;

an obtaining unit, configured to obtain attribute parameters of the at least two window interfaces, wherein the attribute parameters of the at least two window interfaces are indicating whether a window interface is allowed to be folded, when the window interface is not allowed to be folded, scaling down the window interface and controlling the window interface to be displayed in the first display sub-region; and a control unit, configured to display, in the first display sub-region, only one or more window interfaces of the at least two window interfaces that have an attribute parameter satisfying a preset condition.

9. The electronic device according to claim 8, wherein, if the electronic device comprises a first sensing unit, the first judging unit is further configured to judge whether the electronic device has generated the predetermined deformation by using a first sensing parameter of the first sensing unit.

10. The electronic device according to claim 8, wherein the predetermined deformation comprises:

a deformation in which the electronic device is bent into a plurality of sub-parts, or a deformation in which the electronic device is folded into a plurality of sub-parts, wherein a degree of the bending or the folding is larger than a first threshold.

11. The electronic device according to claim 9, wherein, the first sensing unit comprises a plurality of sensing sub-units, and the plurality of sensing sub-units are configured to obtain information about gestures of the plurality of sub-parts of the electronic device.

12. The electronic device according to claim 11, wherein, at least one of the plurality of sensing sub-units are configured to determine that a first part of the electronic device is in a face-upward gesture; and the first judging unit is further configured to determine the display sub-region corresponding to the first part as the first display sub-region in the presentation state.

13. The electronic device according to claim 8, wherein, if the electronic device further comprises a second sensing unit, the first judging unit is further configured to:

determine that a first part of the electronic device is in an uncovered state by using a second sensing parameter of the second sensing unit; and determine the display sub-region corresponding to the first part as the first display sub-region in the presentation state.

14. The electronic device according to claim 8, wherein the electronic device further comprises a second judging unit, configured to display the at least two window interfaces in current display region, when it is judged that the predetermined deformation is recovered.

15. An electronic device, comprising a display unit and being capable of generating a deformation against stress, the display unit of the electronic device without deformation capable of presenting at least two window interfaces, each of the at least two window interfaces being used for displaying a separate display content, the electronic device further comprising:

a processor; and a memory containing instructions, which, when executed by the processor, cause the processor to:

determine a first display sub-region of the display unit which is in a presentation state, when it is judged that the electronic device has generated a predetermined deformation;

obtain attribute parameters of the at least two window interfaces, wherein the attribute parameters of the at least two window interfaces are indicating whether a window interface is allowed to be folded, when the window interface is not allowed to be folded, scaling down the window interface and controlling the window interface to be displayed in the first display sub-region; and display, in the first display sub-region, only one or more of the at least two window interfaces that have an attribute parameter satisfying a preset condition.

* * * * *